March 8, 1966  A. E. BUTER  3,239,110
FERTILIZER PACKAGE AND SPREADER
Filed June 28, 1963
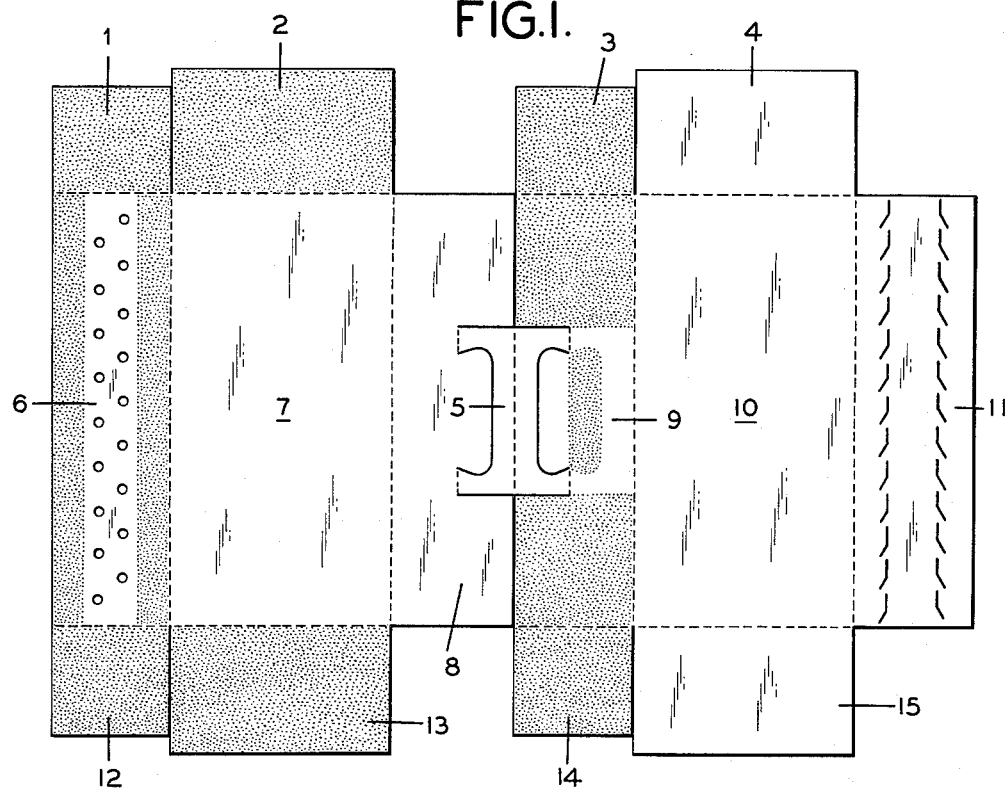
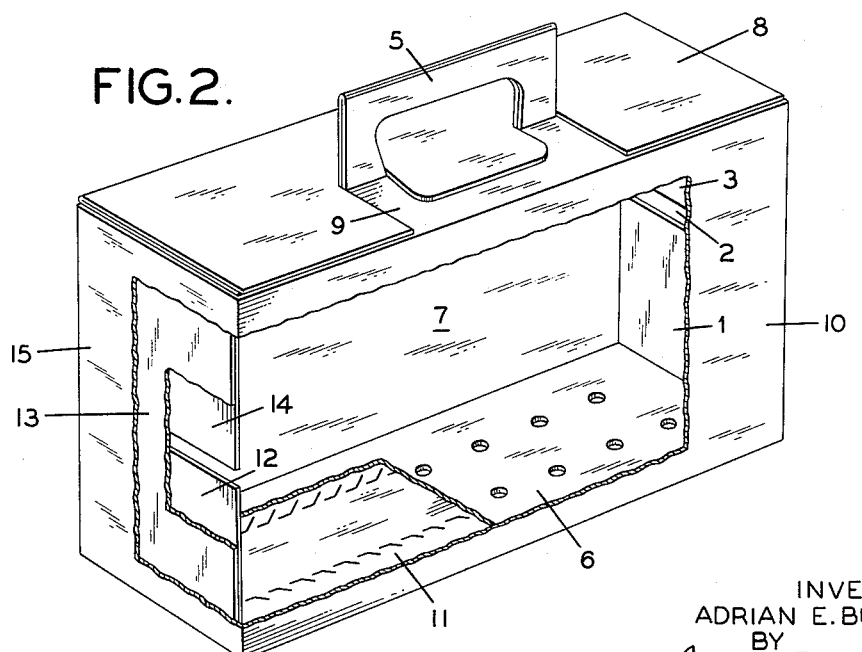
INVENTOR
ADRIAN E. BUTER
BY
AGENT

United States Patent Office 3,239,110
Patented Mar. 8, 1966

3,239,110
FERTILIZER PACKAGE AND SPREADER
Adrian E. Buter, San Jose, Calif., assignor to Allied Chemical Corporation, New York, N.Y., a corporation of New York
Filed June 28, 1963, Ser. No. 291,331
1 Claim. (Cl. 222—465)

This invention relates to a fertilizer package and in particular to a fertilizer package designed to serve as a combination fertilizer container-spreader.

Fertilizers have largely been available in bulk form, i.e., they have been sold in large bags and have necessitated the use of specific equipment designed for spreading the fertilizer on the ground uniformly. The cost of this equipment has been almost prohibitive to the home consumer who have been compelled by circumstances to distribute his fertilizer, bought largely in needlessly high quantity, by hand. This consumer has therefore long desired a fertilizer spreader available at little cost and preferably one which is integral with the fertilizer container. This ideal fertilizer container-spreader has heretofore never been provided. In addition to this, it has long been desired to provide a fertilizer container-spreader which, when being utilized as a spreader, will restrain continuous flow of fertilizer therefrom when the container-spreader is at rest without the necessity of employing separate devices therefor.

It is an object of this invention, therefore, to provide a fertilizer container which does not necessitate the employment of a separate fertilizer spreader. It is another object of this invention to provide a fertilizer container-spreader containing the fertilizer to be distributed on soil spreader containing the fertilizer to be distributed on soil which can be employed to distribute the same thereon.

It is a still further object of this invention to provide a fertilizer package-spreader which by the use of critically sized perforations will distribute the fertilizer upon the ground only when the package is shaken, thereby obviating the necessity for devices designed to restrain the flow of fertilizer when the spreader is at rest. Other objects and advantages will become more apparent from the following description and claim.

This invention contemplates a fertilizer package-spreader comprising a container of pebble type fertilizer having a Tyler screen size between 10 and 24 mesh, said container having generally circular perforations of a diameter between $9/32''$ and $10/32''$, said perforations being covered with a strip, said strip being detachably secured to said container and adapted to be removed thereby exposing said perforations. The term "Tyler screen size" refers to the size of sieves of Tyler standard sieve screens manufactured by the W. S. Tyler Co., Cleveland, Ohio. Preferably the fertilizer package-spreader contains between 18 and 36 perforations, as a container having between 18 and 36 perforations will normally deliver the desired amounts of fertilizer to the area to be fertilized. The number of perforations of course may be correlated with the size of the perforations, the fertilizer composition, and the quantity of fertilizer to be applied.

In the drawings, FIGURE 1 is an extended plan view of a cutting of a yieldable material which can be folded in a manner to provide the fertilizer container of this invention. The stippled areas are those which contact other areas of the container in its assembled form. FIGURE 2 is a perspective view of the fertilizer container of this invention with a handle for carrying the same upright and with a tear strip in place below the circular perforations.

The blank of FIGURE 1 is formed so as to define outside panels of the container 4, 7, 8, 10, 15, together with the spreader assembly of the container comprising the perforation panel 6 which is covered as seen in FIGURE 2, by the tear strip panel 11.

Panel 2 is folded upon panel 4, the scored lines of the blank being bent so as to permit panels to be folded upon one another to form the container of FIGURE 2. Panel 13 is folded upon outside panel 15 and small supporting panels 1 and 3 are folded upon panel 2, corresponding panels 12 and 14 being folded upon panel 13 as seen in FIGURE 2. Perforation panel 6 is bent along the scored lines so as to form the bottom of the container and the tear strip panel 11 is fitted over it so that the tear strip can be readily removed, thus exposing the perforations and converting the container, when assembled, into a fertilizer spreader. Outside panel 8 is folded upon inside panel 9 forming the top of the fertilizer container and, in the embodiment shown, the handle 5 is congruous with the container top 8 but adaptable to be raised, as seen in FIGURE 2, to provide the container with a convenient carrying means.

In filling the carton with a pebble type fertilizer, i.e., a pellet or granular fertilizer, the carton is erected from the flat blank of FIGURE 1, the top and bottom panels are adhesively secured, i.e., outside panel 8 is adhesively secured to inside panel 9 and perforation panel 6 has adhesively secured thereto tear strip panel 11, the latter being on the outside thereof. The flaps forming one end of the carton are then folded and adhesively secured as shown in FIGURE 2 with reference to panels 12, 14, 13 and 15. After the fertilizer has been inserted into the container, the opposite end is closed in the same manner.

When the package is assembled and the pebble-type fertilizer is contained therein the tear strip panel 11 secured to the bottom perforation panel 6 effectively blocks the dispensing holes of the perforation panel and closes the container. These holes, however, can be readily exposed by pulling off the tear strip thereby converting the fertilizer container to a fertilizer spreader.

The fertilizer container-spreader of this invention is constructed so that even if the tear strip has been removed, fertilizer will not flow unless the container is moved. This obviates the necessity for employing fertilizer flow restraining devices and permits the operator to pause in one position in the course of fertilizing the soil without the consequence of a continuous flow of fertilizer upon the ground below. This feature is provided by employing perforations of critical size for the pebble-type fertilizers contained in the container of this invention. The perforations which are generally circular must have a diameter between $9/32$ inch and $10/32$ inch. A smaller diameter than $9/32$ inch will severely limit the flow of fertilizer contained within the container even when it is agitated. If the diameter of the perforations is larger than $10/32$ inch, the flow inhibiting effect when the container is at rest will not be provided but rather a continuous flow of fertilizer on the ground below will be observed.

The container of this invention is suitable for any pebble-type fertilizer which include granular and pelleted fertilizers provided that the fertilizer has Tyler screen size between 10 and 24 mesh. These fertilizers, I have discovered, may be hygroscopic fertilizers since my fertilizer container-spreader prevents substantial atmospheric moisture inclusion when the tear strip is in place. I, therefore, provide a container-spreader suitable for many fertilizers particularly those employed by the home consumer.

In order to utilize the container-spreader for distributing fertilizer upon the soil the operator removes the tear strip and walks with the spreader, carried somewhat in the manner of a suitcase, over the area to be fertilized. For efficient spreading, the case is carried with the long axis (if rectangular in cross-section) perpendicular to the direction of travel. Preferably, the package is gently shaken or agitated. With the circular perforations properly sized, the fertilizer will be distributed evenly on the soil and excessive amounts of fertilizer on any given area will be precluded.

The number of circular perforations provided at the bottom of the container-spreader may be varied depending upon the amount of the specific fertilizer contained therein to be distributed on the area to be fertilized. Generally between 18 and 36 circular perforations or dispensing holes are preferred, but the number of holes should be correlated with the size of the perforations, the particular fertilizer composition contained in the container-spreader, and the quantity of fertilizer to be applied.

I therefore provide a combination fertilizer container-spreader wherein the spreader is an integral part of the container. This fertilizer container-spreader, it is readily seen, can be easily assembled at the place where the fertilizer is prepared. It is to be further noted that this new fertilizer container-spreader is particularly adaptable for use by the home consumer who desires to purchase his fertilizer in generally smaller quantities than farmers and the like and who has, heretofore, generally had to distribute his fertilizer by hand, using a mechanical spreader which he must purchase, clean, and store. I further provide a fertilizer container-spreader which inhibits the flow of fertilizer therefrom when the spreader is at rest by use of critically sized perforations.

While certain embodiments of my invention have been taught herein, these are for purposes of illustration and not limitation, since certain departures or variations of this disclosure will be obvious to one skilled in the art.

I claim:

A fertilizer package-spreader comprising a rectangularly shaped box having four side walls, a top wall and a bottom wall, said top wall having a recess to accommodate a handle foldable therein, said handle and recess being disposed on the exterior of said top wall, said bottom wall have a plurality of circular perforations disposed oppositely to said handle, said perforations being between 18 and 36 in number and between $9/32$ inch and $10/32$ inch in diameter, said perforations being covered by a strip, said strip being detachably secured to said container and adapted to be removed, the end sides of said container being at least two ply, adhesively secured to one another and having interior supports extending along said end sides substantially parallel thereto, said container containing a pebble-type fertilizer having a Tyler sieve size between 10 and 24 mesh.

References Cited by the Examiner

UNITED STATES PATENTS

| | | | |
|---|---|---|---|
| 40,605 | 11/1863 | Cadwell | 222—465 X |
| 601,884 | 4/1898 | Tucker | 229—17 UX |
| 1,632,540 | 6/1927 | Clarke | 222—465 |
| 1,849,159 | 3/1932 | Torrence | 222—541 X |
| 2,698,125 | 12/1954 | Vizcarrondo et al. | 222—52 |
| 2,748,996 | 6/1956 | Fritschi | 222—465 |
| 2,750,096 | 6/1956 | Misch | 229—511 |
| 2,767,886 | 10/1956 | Jenkins | 222—189 X |
| 2,776,787 | 1/1957 | Nicol | 220—24 X |
| 2,833,445 | 5/1958 | Spiers | 222—189 |
| 2,861,719 | 11/1958 | Trotter | 222—541 X |
| 3,107,822 | 10/1963 | Regenstein | 222—177 |
| 3,113,702 | 12/1963 | Luedtke | 222—541 X |

FOREIGN PATENTS

| | | |
|---|---|---|
| 17,381 | 8/1904 | Great Britain. |
| 10,529 | 1/1900 | Sweden. |

RAPHAEL M. LUPO, *Primary Examiner.*